United States Patent
Chen

(10) Patent No.: US 7,002,888 B2
(45) Date of Patent: Feb. 21, 2006

(54) OPTICAL RECORDING APPARATUS AND RELATED METHOD

(75) Inventor: Hong-Ching Chen, Kao-Hsiung Hsien (TW)

(73) Assignee: Mediatek Incorporation, Hsin-Chu Hsien (TW)

(*) Notice: Subject to any disclaimer, the term of this patent is extended or adjusted under 35 U.S.C. 154(b) by 0 days.

(21) Appl. No.: 10/906,456

(22) Filed: Feb. 21, 2005

(65) Prior Publication Data
US 2005/0243682 A1   Nov. 3, 2005

(30) Foreign Application Priority Data
Apr. 30, 2004 (TW) .............................. 93112118 A

(51) Int. Cl.
*G11B 5/09* (2006.01)
(52) U.S. Cl. .................. 369/59.21; 369/47.48; 369/124.07
(58) Field of Classification Search ............ 369/59.11, 369/59.19, 116, 47.5, 59.2, 124.07, 124.14, 369/47.28, 47.48, 59.21, 59.17, 59.18, 47.35; 360/32, 39
See application file for complete search history.

(56) References Cited

U.S. PATENT DOCUMENTS

| | | | | |
|---|---|---|---|---|
| 4,835,759 A * | 5/1989 | Saito et al. | ................ | 369/59.2 |
| 5,414,689 A * | 5/1995 | Maeda et al. | ............ | 369/59.11 |
| 5,537,422 A * | 7/1996 | Shimpuku et al. | .......... | 714/775 |
| 5,606,540 A * | 2/1997 | Hayashi | ................... | 369/59.21 |
| 6,876,616 B1 * | 4/2005 | Tonami | ................... | 369/59.17 |
| 2003/0053389 A1 | 3/2003 | Mashimo | | |

* cited by examiner

Primary Examiner—Ali Neyzari
(74) Attorney, Agent, or Firm—Winston Hsu

(57) ABSTRACT

An optical recording apparatus for recording a plurality of information units on an optical storage medium. Each of the information units includes a long run-length sync pattern. The optical recording apparatus includes a recording means for recording the plurality of information units on the optical storage medium and a sync pattern selector for determining the type of each of the long run-length sync patterns. The sync pattern selector determines at least one long run-length sync pattern as a mark when marks with run-lengths longer than a first length threshold do not appear for a time period longer than a first time threshold. The sync pattern selector determines at least one long run-length sync pattern as a space when spaces with run-lengths longer than a second length threshold do not appear for a time period longer than a second time threshold.

26 Claims, 7 Drawing Sheets

State1/State2

| | Primary SYNC codes | Secondary SYNC codes |
|---|---|---|
| SY0 = | 0001001001000100 0000000000010001 / | 0001001000000100 0000000000010001 |
| SY1 = | 0000010000000100 0000000000010001 / | 0000010001000100 0000000000010001 |
| SY2 = | 0001010000000100 0000000000010001 / | 0001010001000100 0000000000010001 |
| SY3 = | 0000010000000100 0000000000010001 / | 0000010001000100 0000000000010001 |
| SY4 = | 0010000000000100 0000000000010001 / | 0010000001000100 0000000000010001 |
| SY5 = | 0010001001000100 0000000000010001 / | 0010001000000100 0000000000010001 |
| SY6 = | 0010010010000100 0000000000010001 / | 0010010000000100 0000000000010001 |
| SY7 = | 0010010010000100 0000000000010001 / | 0010010000000100 0000000000010001 |

State3/State4

| | Primary SYNC codes | Secondary SYNC codes |
|---|---|---|
| SY0 = | 1001001000000100 0000000000010001 / | 1001001001000100 0000000000010001 |
| SY1 = | 1000010001000100 0000000000010001 / | 1000010000000100 0000000000010001 |
| SY2 = | 1001000001000100 0000000000010001 / | 1001000000000100 0000000000010001 |
| SY3 = | 1000010001000100 0000000000010001 / | 1000001000000100 0000000000010001 |
| SY4 = | 1000100001000100 0000000000010001 / | 1000100000000100 0000000000010001 |
| SY5 = | 1000100100000100 0000000000010001 / | 1000000100000100 0000000000010001 |
| SY6 = | 1001000010000100 0000000000010001 / | 1000000010000100 0000000000010001 |
| SY7 = | 1000100010000100 0000000000010001 / | 1000000010000100 0000000000010001 |

Fig. 2 Related Art

OPTICAL RECORDING APPARATUS AND RELATED METHOD

BACKGROUND

The present invention relates to optical recording apparatuses, and more particularly, to optical recording apparatuses that record data on optical storage media.

Optical storage medium, such as DVD discs, is currently a kind of very popular storage medium. For recording data onto an optical disc, the pickup head of an optical disc drive, which is a kind of optical recording apparatus, is used to output laser light with appropriate laser power onto the optical disc. FIG. 1 shows how laser power alternates when data are recoded onto different kinds of optical discs. For a write-once disc, the laser power alternates between a peak power level, a write power level, and a read power level; and if a single mark is going to be established, a single recording pulse will be generated by the laser diode. For a rewritable disc, the laser light power alternates frequently between a write power level, an erase power level, and a bias power level; and if a single mark is going to be established, a plurality of recording pulses (multi pulse) will be generated by the laser diode.

In order to process accurate servo control tasks on the pickup head when recording data on the optical disc, a servo control system of an optical disc drive detects the states of particular signals, such as a focus error signal FE and a tracking error signal TE. Besides, for controlling the laser power at ideal level(s) when recording data on write-once discs (such as CD-R and DVD-R), an automatic power control apparatus (APC) of the optical disc drive is used to detect the real write power and the real read power through a front photodiode output signal FPDO. And for controlling the laser power at ideal level(s) when recording data on rewritable discs (such as CD-RW and DVD-RW), the automatic power control apparatus is used to detect the erase power through the front photodiode output signal FPDO.

Both the previously mentioned servo control process and automatic power control process involve signal status detection. Since the signals alternate frequently as illustrated in FIG. 1, the optical disc drive always uses a sample-and-hold scheme to detect signal status at different power levels. However, considering the restriction on the settling time and sampling speed of the used sampler, and to ensure that the detected signal does not vary too large during the sampling period, signals are sampled only when data patterns (marks or spaces) with run-lengths longer than a length threshold are established. For a low writing speed application, the above-mentioned length threshold is not large, and ordinary frame data is enough for providing data patterns that are long enough for the sampler to sample. Nevertheless, for a high writing speed application, the above-mentioned length threshold becomes larger and ordinary frame data might not be able to provide data patterns that are long enough for the sampler to sample. In this situation, the importance of long run-length sync patterns in frame sync codes becomes more significant.

Taking CD type optical discs (such as CD-R or CD-RW) as an example, there is a frame sync code at the beginning part of each frame. Each frame sync code includes two successive 11T patterns (one is a 11T mark and the other one is a 11T land, both of which can be viewed as a long run-length sync pattern), where T is the length unit of each channel bit. In other words, each frame includes at least one 11T mark and one 11T land, hence there are enough opportunities for the optical disc drive to sample on specific signal(s).

In DVD type optical discs, however, the situation is different. Concerning DVD type optical discs, there are four kinds of recording units, which are "channel bit", "data frame", "data sector", and "error correction code block" (ECC block). Channel bit is the smallest recording unit in optical discs, and normally 'T' is used to represent the length of each channel bit. When each byte (containing 8 bits) of data is going to be recorded on an optical disc, eight to fourteen modulation plus (EFM+) will be used to convert 8 bits data into 16 channel bits. The EFM+ restricts that channel bits with the same state (i.e. consecutive marks or consecutive spaces) cannot be shorter than 3T or longer than 11T. In other words, except for frame sync codes, the legal run-lengths of frame data lie between 3T and 11T, run-lengths shorter than 3T or longer than 11T are treated as illegal run-lengths. In the case of frame sync code of DVD type optical discs, different from that of CD type optical disc, each frame sync code contains only one 14T pattern, which could be a 14T mark or a 14T space.

FIG. 2 shows possible data patterns of sync codes in DVD type optical discs. A sync code at the beginning of a frame is determined according the next state of the ending codeword of a previous frame and has two choices, one is primary sync code and the other one is secondary sync code.

When data are recorded onto an optical disc, it is necessary to make the low frequency component as low as possible (or the DC component be as low as possible). Hence, an optical disc drive must continue accumulating a digital sum value (DSV) when data are recorded. For a channel bit '1' being recorded, the DSV is increased by one; and for a channel bit '0' being recorded, the DSV is decreased by one. The DSV should be controlled to be as small as possible. Therefore, each sync code is determined as the primary sync code or the secondary sync code to minimize the DSV. As shown in FIG. 2, at the end of each sync code there is a 22-bit data pattern "0001000000000000010001" (always the same), after a non return to zero invert (NRZI) is applied, the "10000000000000" part of this 22-bit data pattern becomes 14 channel bits with the same state (being a 14T mark or a 14T space), which is referred to as a 14T pattern, and could be viewed as the long run-length sync pattern of DVD type optical discs. The polarity of the 14T pattern in the primary sync code is opposite to that of the 14T pattern in the corresponding secondary sync code. That is, for each pair of a primary sync code and a corresponding secondary sync code, one has the 14T pattern as a mark and the other has the 14T pattern as a space. Moreover, as mentioned before, a sync code is determined to be the primary sync code or the secondary sync code to let the DSV to be minimized.

Aside from determining the type of each 14T pattern according to the DSV minimization principle, United States published application No. 2003/0053389 also discloses an optical disc apparatus that establish a sync pattern of a frame in a plurality of frames to be a mark, and sync pattern(s) of the other frame(s) in the plurality of frames is established as a mark or a space according to the DSV minimization principle.

The scheme disclosed by the United States published application No. 2003/0053389 primarily suits optical disc drives applying a running optimum power control (ROPC), since in the ROPC scheme, the need for sampling on 14T marks is more important than that in automatic power control (APC) scheme. However, in a high writing speed application, the need for sampling on 14T spaces become important too, and this kind of situation is not considered in this published application. In addition, since a sync pattern of a frame in a plurality of frames is fixedly established as a mark, the optical disc drive could not adaptively determine the type of each sync pattern according to the real situation on every time point, hence this published application is not the optimal solution.

SUMMARY

It is therefore an objective of the claimed invention to provide an optical recording apparatus and related method that determines the type of each long run-length sync patterns more adaptively.

According to the claimed invention, an optical recording apparatus is disclosed. The optical recording apparatus is for recording a plurality of information units on an optical storage medium. Each of the information units includes a long run-length sync pattern. The optical recording apparatus includes a recording means for recording the plurality of information units on the optical storage medium and a sync pattern selector for determining the type of each of the long run-length sync patterns. The sync pattern selector determines at least one long run-length sync pattern as a mark when marks with run-lengths longer than a length threshold do not appear for a time period longer than a time threshold.

According to the claimed invention, a method used by an optical recording apparatus is disclosed. The optical recording apparatus includes a recording means for recording a plurality of information units on an optical storage medium. Each of the information units has a long run-length sync pattern. The method includes determining a time period that marks with run-lengths longer than a length threshold do not appear; and if the time period that marks with run-lengths longer than the length threshold do not appear is longer than a time threshold, establishing at least one long run-length sync pattern as a mark.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 2 shows possible sync code data patterns for DVD type optical discs.

DETAILED DESCRIPTION

Figure 1:
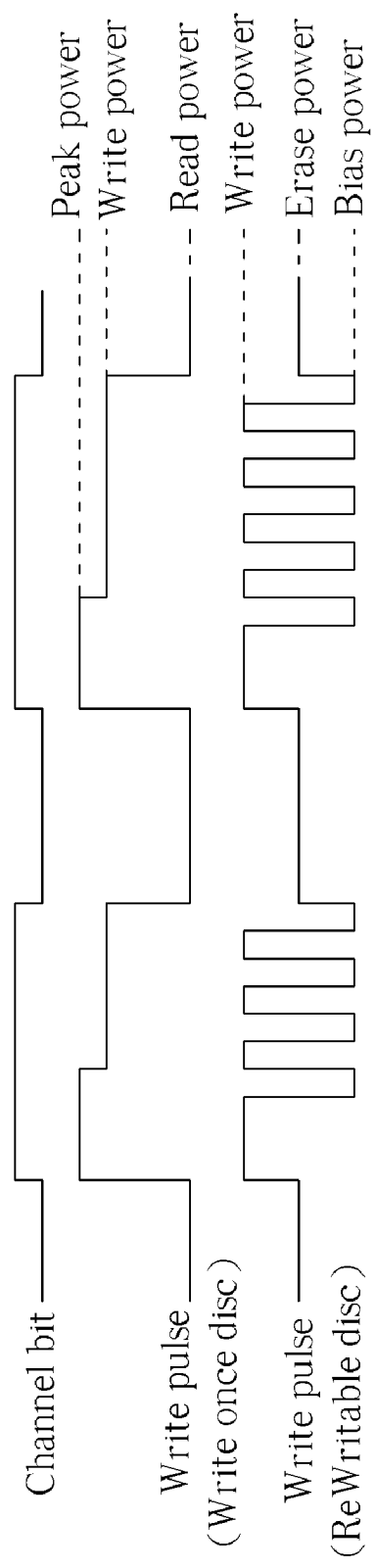
FIG. 1 shows how laser power alternates when data are recorded on different kinds of optical discs.
Figure 3:
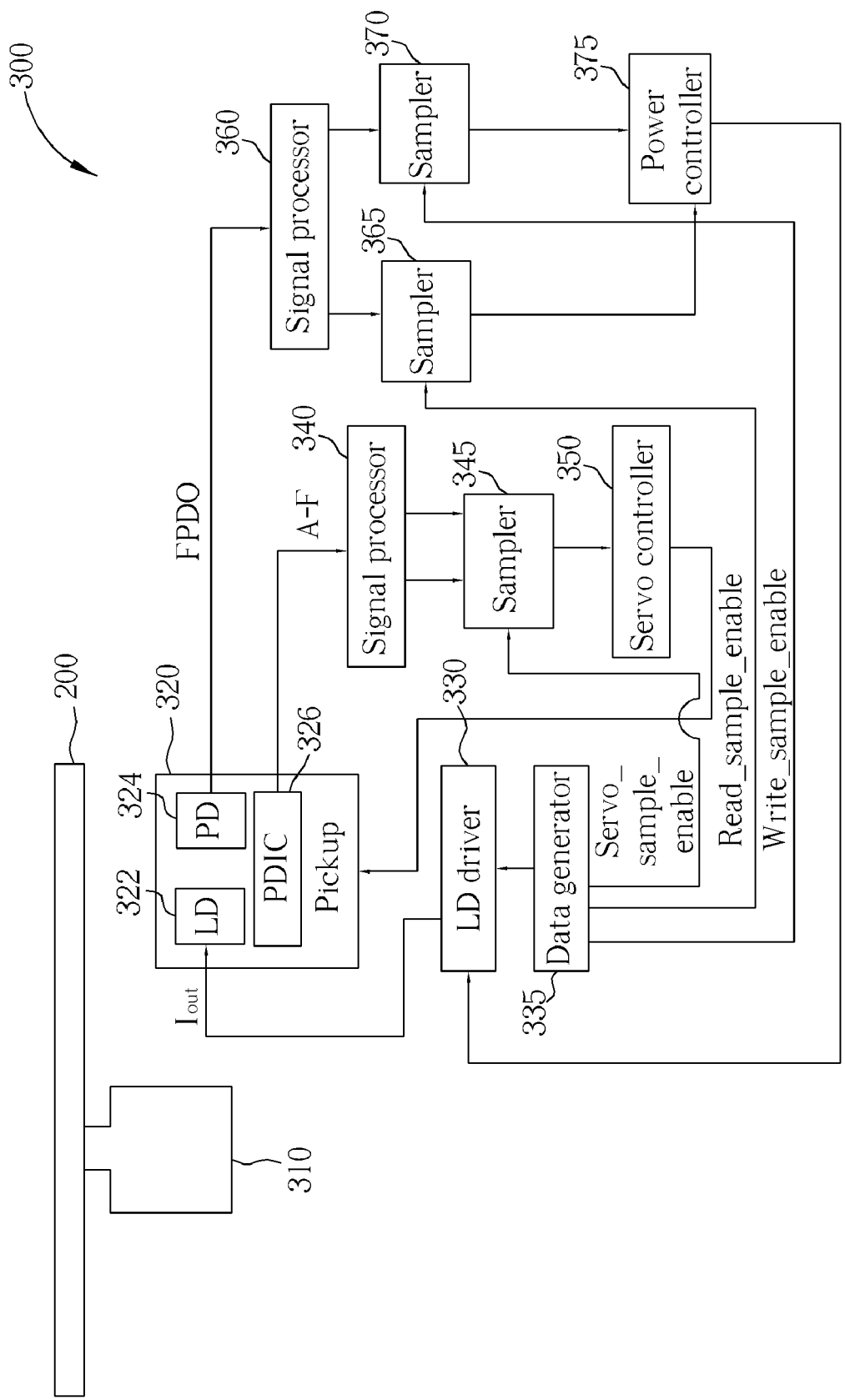
FIG. 3 shows a block diagram of an optical disc drive according to an embodiment of the present invention.

FIG. 3 shows an optical recording apparatus according to an embodiment of the present invention. The optical recording apparatus 300 shown in FIG. 3 records a plurality of information units on an optical storage medium 200 by establishing marks and spaces on the tracks of the optical storage medium 200. Each of the information units includes a long run-length sync pattern. The following description will use a DVD type optical disc as an example of the optical storage medium 200. In this situation the above mentioned information units correspond to frames on the DVD type optical disc 200 and the long run-length sync patterns correspond to 14T patterns in the frame sync code of the DVD type optical disc 200.

The optical recording apparatus 300 includes a spindle motor for rotating the optical disc 200 and a data generator 335 for generating the data going to be recorded on the optical disc 200 and sending the generated data to a laser diode driver (LD driver) 330. The LD driver 330 generates a driving current $L_{out}$ according to the data received from the data generator 335 and the generated driving current $L_{out}$ is sent to a pickup head 320. The pickup head 320 has a laser diode (LD) 322, a photo diode (PD) 324, and a photo diode integrated circuit (PDIC) 326. The laser diode 322 generates a laser light according to the received driving current $L_{out}$, and then marks and spaces are established on the optical disc 200. The photo diode 324 detects the laser light generated by the laser diode 322 to generate a photo diode output signal FPDO. The PDIC 326 receives light signal reflected from the optical disc 200 to generate corresponding A, B, C, D, E, F signals.

After receiving A–F signals generated by the PDIC 326, a signal processor 340 generates corresponding servo control signals accordingly, such as a tracking error signal TE and a focusing error signal FE. Controlled by a servo_sample_enable signal generated by the data generator 335, a sampler 345 samples the TE signal and the FE signal under reading/erasing powers and sends the sampled signal to the servo controller 350. Then the servo controller 350 generates suitable control signal to control the operation of the pickup head 320.

The FPDO signal generated by the photo diode 324 is sent to a signal processor 360 for further processing. Controlled by a read_sample_enable signal and a write_sample_enable signal generated by the data generator 335, a sampler 365 and a sampler 370 samples the FPDO signal at reading power level and writing power level respectively. After the sampled signals generated by the samplers 365 and 370 are sent to the power controller 375, the power controller 375 generates a suitable control signal to control the power level of the laser light outputted by the laser diode 322. Please note that if the optical disc 200 is a re-writable disc, using only one sampler to sample at erasing power level will be enough for the optical disc drive 300.

Figure 4:
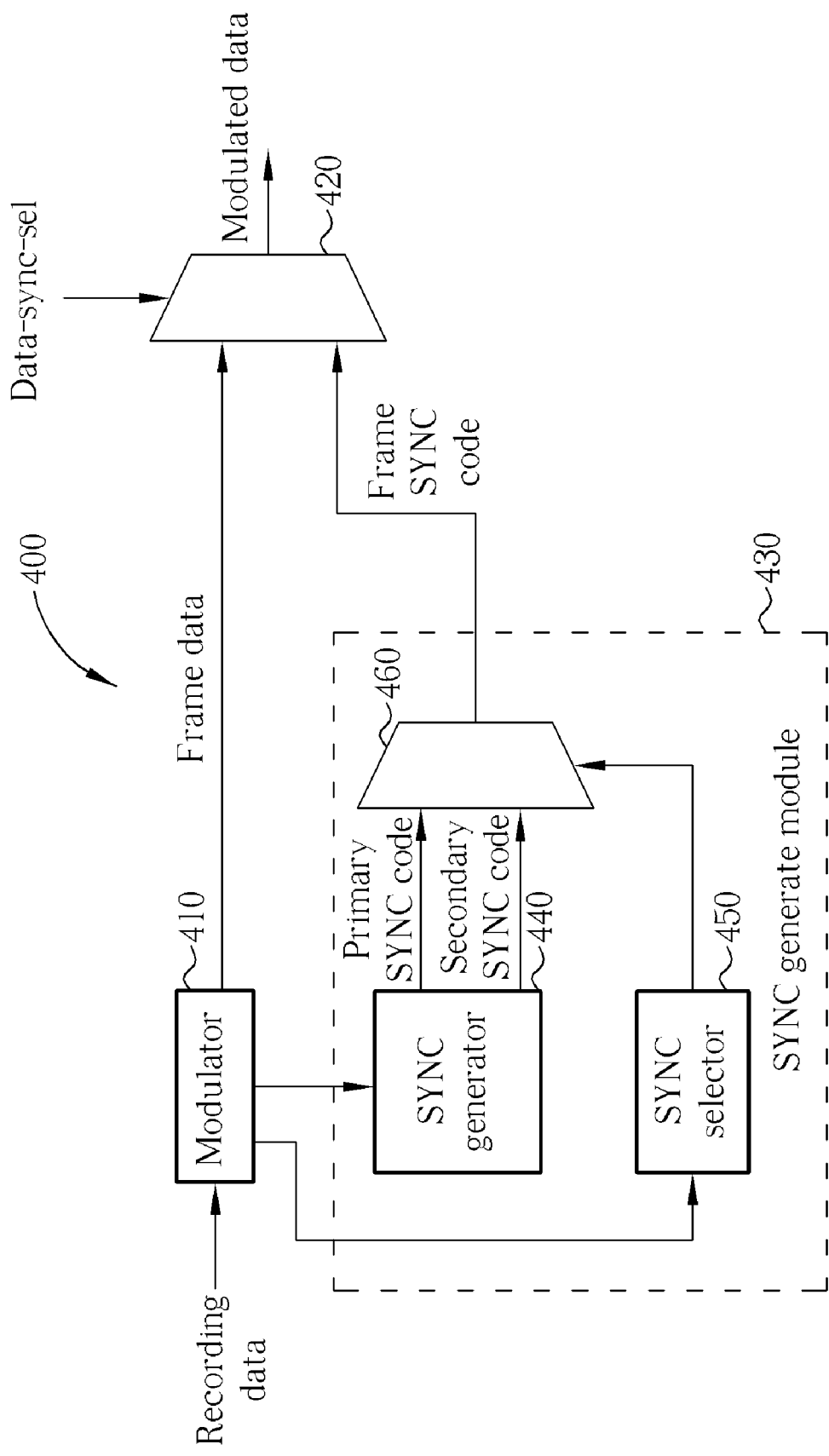
FIG. 4 shows a block diagram of the encoder in FIG. 3 according to an embodiment of the present invention.

Aside from the circuits used for generating those sample_enabling signals (such as the read_sample_enable signal and the write_sample_enable signal), the data generator 335 further comprises an encoder, which is used to generate the modulated data that is going to be recorded on the optical disc 200. FIG. 4 shows a block diagram of an encoder included in the data generator 335 of FIG. 3 according to an embodiment of the present invention. In this embodiment, the encoder 400 comprises a modulator 410, a SYNC pattern generate module 430, and a multiplexer 420. The modulator 410 modulates the recording data into the frame data, which is going to be recorded in each frame. The multiplexer 420 selectively outputs the frame data or the frame sync code as the modulated data according to a data-sync-sel signal. The SYNC pattern generate module 430 generates the frame sync code that is going to be recorded in each frame. The SYNC pattern generate module 430 comprises a SYNC pattern generator 440, a SYNC pattern selector 450, and a multiplexer 460. The SYNC pattern generator 440 determined the sync code at the beginning of each frame according the next state of the ending codeword of a previous frame. As mentioned before, there are two choices for each sync code, one is primary sync code and the other one is secondary sync code. Controlled by the SYNC pattern selector 450, the multiplexer 460 selectively outputs either the primary sync code or the secondary sync code as the sync code of each frame. When the 14T pattern of the primary sync code corresponds to a 14T mark, the 14T pattern of the secondary sync code corresponds to a 14T space. When the 14T pattern of the primary sync code corresponds to a 14T space, the 14T pattern of the secondary sync code corresponds to a 14T mark. Hence, the SYNC pattern selector 450 could determine whether a 14T mark or a 14T space will be established in each frame as the 14T pattern of the frame.

As mentioned before, restricted by the settling time and sampling speed of the samplers 345, 365, and 370 and the writing speed of the optical disc drive 300, only when marks or spaces with run-lengths longer than a predetermined length threshold are established on the optical disc 200, the samplers 345, 365, and 370 could sample on specific signals effectively. At this moment, the data generator 335 issues a sampling command through the servo_sample_enable signal, the read_sample_enable signal, or the write_sample_enable signal. For example, under 8× writing speed, the length threshold LEN_TH_MARK corresponding to marks and the length threshold LEN_TH_SPACE corresponds to spaces might both be 6T, hence the sampler 345, 365, and 370 sample on specific signals only when data patterns (marks or spaces) with run-lengths longer than 6T are established on the optical disc 200. Under 16× writing speed, the length threshold LEN_TH_MARK corresponding to marks and the length threshold LEN_TH_SPACE corresponds to spaces might both be 12T, hence the sampler 345, 365, and 370 sample on specific signals only when data patterns (marks or spaces) with run-lengths longer than 12T are established on the optical disc 200 (under this circumstance, only 14T patterns in each frame sync code could provide enough sampling time for the samplers 345, 365, 370). Please note that the length threshold LEN_TH_MARK corresponding to marks and the length threshold LEN_TH_SPACE corresponds to spaces does not have to be the same value, different values could also be used.

The sampler 345 of this embodiment samples on the TE and FE signals only when spaces with run-lengths longer than LEN_TH_SPACE are recorded into the optical disc 200. For the proper operation of the servo control process, the sampler 345 must have an adequate sampling rate. It's preferred that the appearing frequency of spaces with run-lengths longer than LEN_TH_SPACE be larger than a specific value, i.e. the distance between two adjacent spaces with run-lengths longer than LEN_TH_SPACE should not be longer than a specific value $N_{space}$ (the unit is number of frames). For example, assume that the sampler 345 only samples on 14T spaces and the optical disc drive 300 operates under 16× writing speed, the channel bit frequency would be 419 MHz, and the appearing frequency of 14T patterns would be 419 MHz/1488=281 KHz. If the operation bandwidth of the servo controller 350 is 20 KHz, then the sampling rate of the sampler 345 should be at least 40 KHz. Under these circumstances, for fulfilling the servo control requirement, the $N_{space}$ could be set as 7 (281 KHz/40 KHz≈7).

Figure 5:
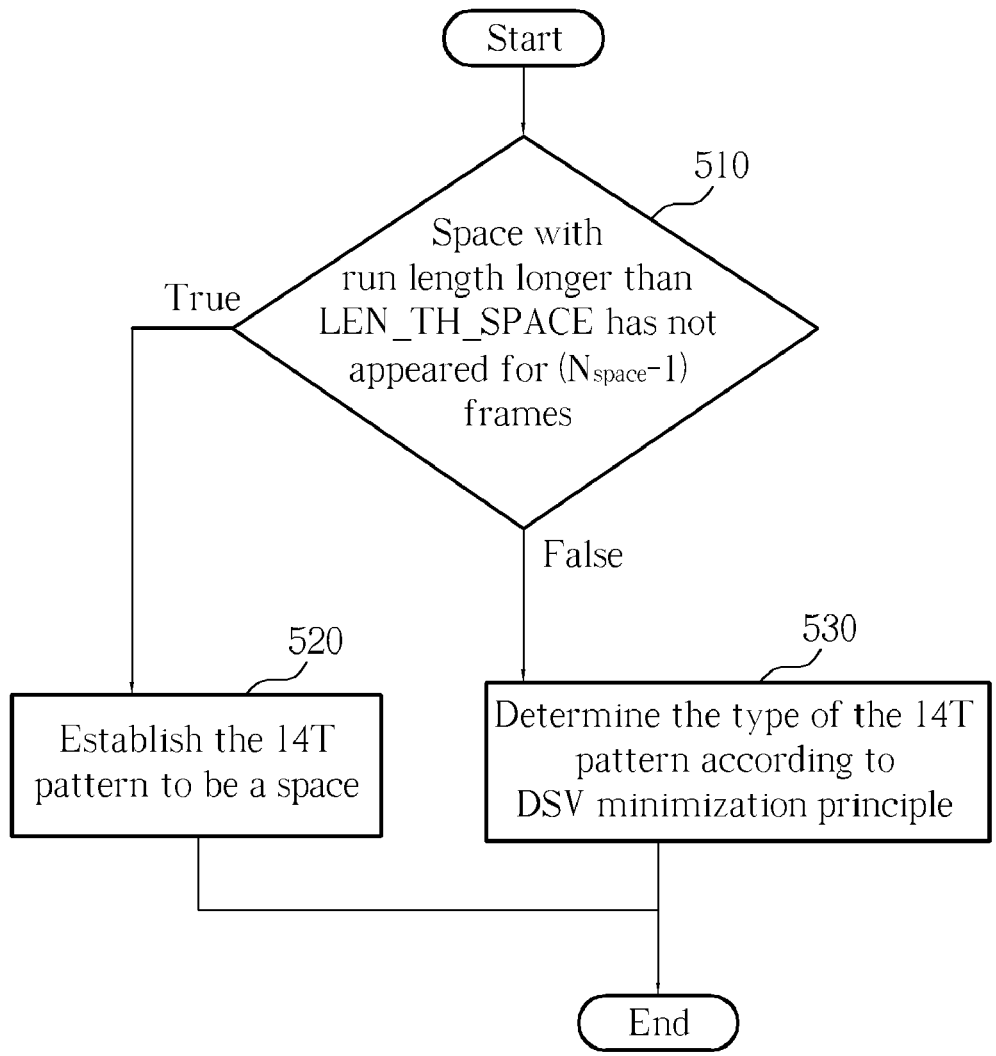
FIG. 5 shows a first flowchart illustrating how the sync pattern selector of FIG. 4 determines the type of each 14T pattern according to an embodiment of the present invention.

Considering the requirement of the sampler 345, to determine the type (mark or space) of a 14T pattern, the flowchart shown in FIG. 5 could be implemented by the SYNC pattern selector 450. That is, in step 510, determining whether space with run-length longer than LEN_TH_SPACE has not appeared for ($N_{space}$-1) frames. In step 520, since a space with run-length longer than LEN_TH_SPACE has not appeared for ($N_{space}$-1) frames, the SYNC pattern selector 450 establishes the 14T pattern as a space compulsively for providing sampling opportunity to the sampler 345. In step 530, since a space with run-length longer than LEN_TH_SPACE appears within previous ($N_{space}$-1) frames, the SYNC pattern selector 450 establishes the 14T pattern as a space or a mark according to the DSV minimization principle, i.e. to establish the 14T pattern as a space or a mark so as to let the DSV be minimized. Please note that random strategy could also be used in step 530.

In addition, the sampler 370 of this embodiment operates only when marks with run-lengths longer than LEN_TH_MARK are recorded into the optical disc 200. For the proper operation of the automatic power control process, the sampler 370 must have adequate sampling rate. It is preferred that the appearing frequency of marks with run-lengths longer than LEN_TH_MARK be larger than a specific value, i.e. the distance between two adjacent marks with run-lengths longer than LEN_TH_MARK should not be longer than a specific value $N_{mark}$ (the unit is number of frames). For example, assume that the sampler 370 only samples on 14T marks and the optical disc drive 300 operates under 16× writing speed, the channel bit frequency would be 419 MHz. If the operation bandwidth of the automatic power control is 1 KHz, then the sampling rate of the sampler 370 should be at least 2 KHz. Under these circumstances, for fulfilling the APC requirement, the $N_{mark}$ could be set as 140 (281 KHz/2 KHz≈140). Besides, the sampler 365 operates when the pickup head 320 establishes spaces with run-lengths longer than LEN_TH_SPACE on the optical disc 200. Since the bandwidth requirement of the APC is smaller than the bandwidth requirement of the servo control process, in this embodiment the value of $N_{space}$ is determined according to the sampling rate required by the servo control process. Please note that for spaces, the length threshold corresponding to the sampler 365 does not have to be the same as the length threshold corresponding to the sampler 345. Another flowchart being similar to that shown in FIG. 5 could be applied to satisfy the requirement of the sampler 365.

Figure 6:
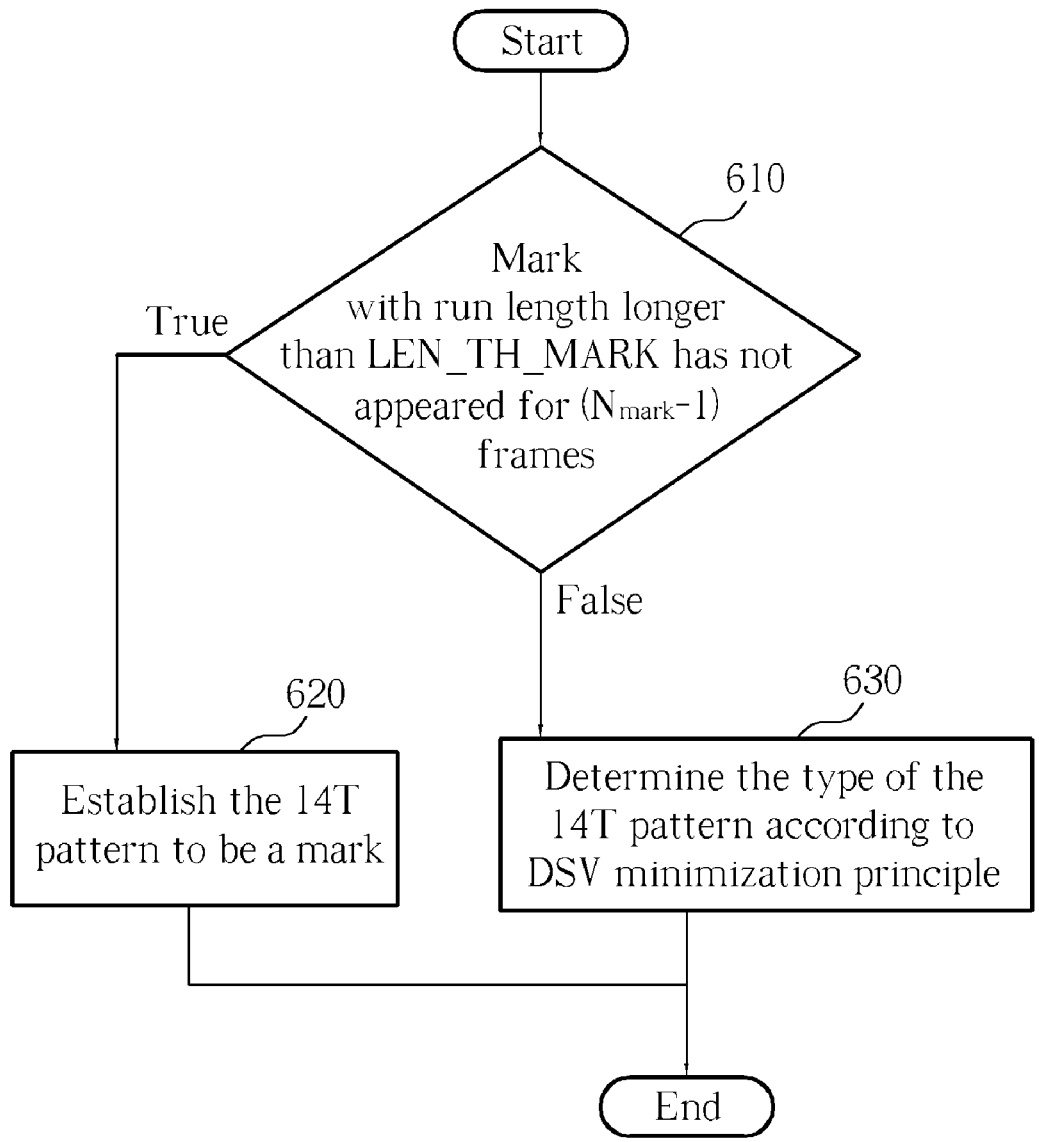
FIG. 6 shows a second flowchart illustrating how the sync pattern selector of FIG. 4 determines the type of each 14T pattern according to another embodiment of the present invention.

Considering the requirement of the sampler 370, to determine the type (mark or space) of a 14T pattern, the flowchart shown in FIG. 6 could be implemented by the SYNC pattern selector 450. That is, in step 610, determining whether a mark with run-length longer than LEN_TH_MARK has not appeared for ($N_{mark}$-1) frames. In step 620, since a mark with run-length longer than LEN_TH_MARK has not appeared for ($N_{mark}$-1) frames, the SYNC pattern selector 450 establishes the 14T pattern as a mark compulsively for providing sampling opportunity to the sampler 370. In step 630, since a mark with run-length longer than LEN_TH_MARK appears within previous ($N_{mark}$-1) frames, the SYNC pattern selector 450 establishes the 14T pattern as a space or a mark according to the DSV minimization principle, i.e. to establish the 14T pattern as a space or a mark so as to let the DSV be minimized. Please note that random strategy could also be used in step 630.

Figure 7:
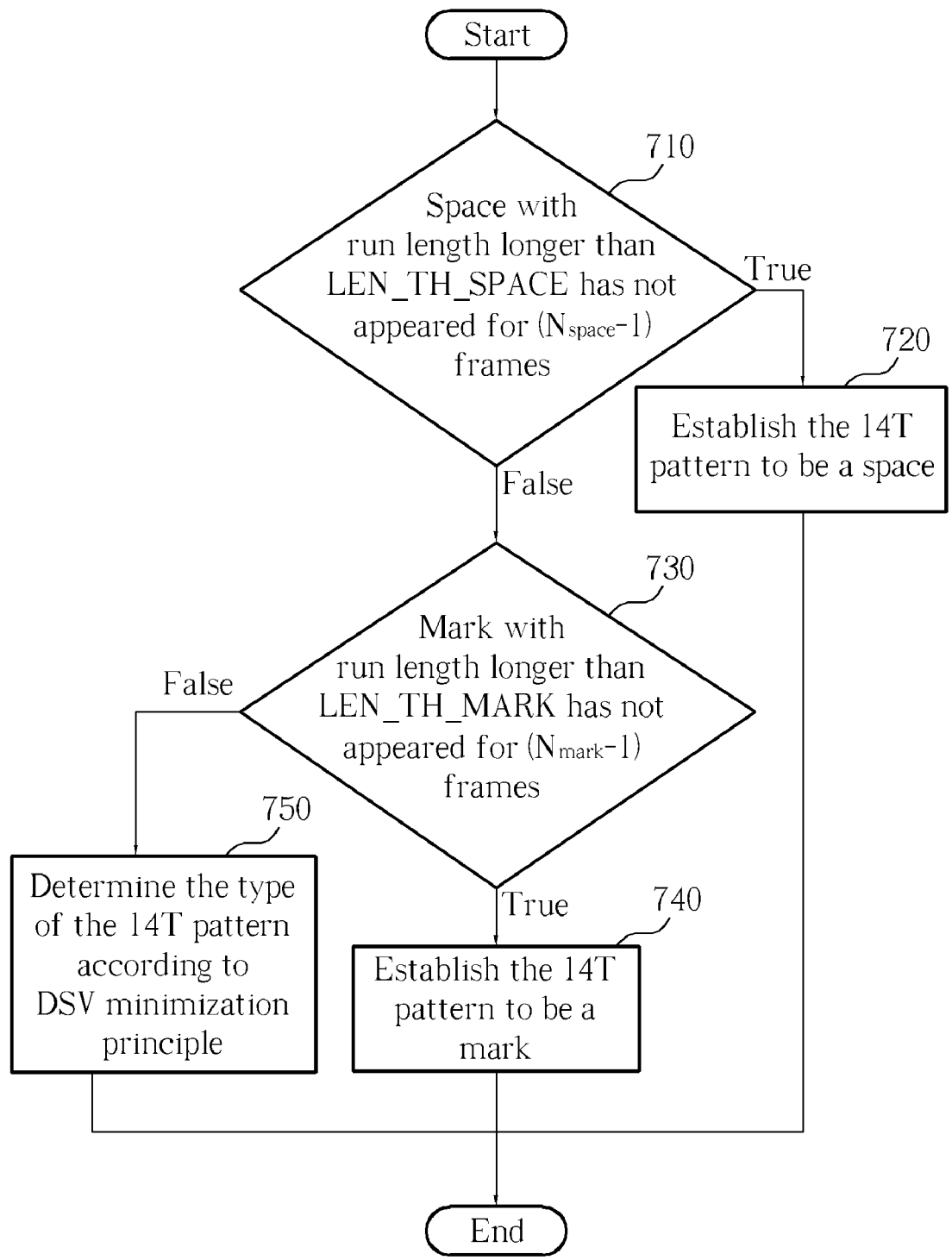
FIG. 7 shows a third flowchart illustrating how the sync pattern selector of FIG. 4 determines the type of each 14T pattern according to yet another embodiment of the present invention.

It is apparent that the flowcharts shown in FIG. 5 and FIG. 6 could be combined as shown in FIG. 7. Since the basic ideas are the same, redundant description will be omitted. In the previous illustration, it is assumed that the samplers 345, 365, 370 operate only when 14T marks or 14T spaces are recorded on the optical disc 200. However, under lower writing speeds, both LEN_TH_SPACE and LEN_TH_MARK could be set smaller; and in the frame data of each frame there will be some spaces with run-lengths longer than LEN_TH_SPACE and some marks with run-lengths longer than LEN_TH_MARK. These spaces and marks could provide the samplers 345, 365, 370 more sampling opportunities. The SYNC pattern selector 450 does not have to set too many 14T patterns compulsively as spaces or marks. Most of the 14T patterns have could have a type (space or mark) being determined according to the DSV minimization principle.

In the related art, the types of all 14T patterns are determined according to the DSV minimization principle. Alternatively, as taught by United States published application No. 2003/0053389, one 14T pattern among a plurality of 14T patterns is established as a mark fixedly. In contrast, the present invention adaptively determines the type of each 14T pattern according to different sampling requirements required by the servo control system or the automatic power control system. Only when a 14T mark or a 14T space is urgently needed for providing sampling opportunity, a 14T pattern would be established as a mark or a space compulsively. Otherwise, the type of each 14T pattern could be determined according to the DSV minimization principle.

Please note that the above-mentioned power control refers to automatic power control (APC). However, other power control schemes such as running optimum power control (ROPC) or optimum power control (OPC) could also be applied with ideas provided by the present invention. In addition, relevant parameters such as $N_{mark}$ and $N_{space}$ could be determined according to the requirements of applied power control scheme.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical recording apparatus for recording a plurality of information units on an optical storage medium, each of the information units comprising a long run-length sync pattern, the optical recording apparatus comprising:
   a recording means for recording the plurality of information units on the optical storage medium; and
   a sync pattern selector, for determining the type of each of the long run-length sync patterns, wherein the sync pattern selector determines at least one long run-length sync pattern as a mark when marks with run-lengths longer than a length threshold do not appear for a time period longer than a time threshold.

2. The optical recording apparatus of claim 1, wherein when marks with run-lengths longer than the length threshold do appear within a time period shorter than the time threshold, the sync pattern selector determines the type of the at least one long run-length sync pattern so as to allow a digital sum value (DSV) to be minimized.

3. The optical recording apparatus of claim 1, wherein the optical recording apparatus determines the time threshold according to a writing speed used by the optical recording apparatus when recording the plurality of information units on the optical storage medium.

4. The optical recording apparatus of claim 1, wherein the recording means comprises a pickup head, the optical recording apparatus generates a receiving signal according to a light beam reflected from the optical storage medium and detected by the pickup head, and the optical recording apparatus further comprises:
   a sampler, for sampling the receiving signal when marks with run-lengths longer than the length threshold are established on the optical storage medium in order to generate a sampled signal; and
   a controller, for generating a control signal according to a signal status of the sampled signal, and controlling the pickup head with the control signal.

5. The optical recording apparatus of claim 4, wherein the signal status of the sampled signal corresponds to a power level of the laser light outputted by the pickup head when marks are established on the optical storage medium.

6. The optical recording apparatus of claim 5, wherein the controller controls the power level of the laser light outputted by the pickup head when marks are established on the optical storage medium according to the control signal.

7. An optical recording apparatus for recording a plurality of information units on an optical storage medium, each of the information units comprising a long run-length sync pattern, the optical recording apparatus comprising:
   a recording means for recording the plurality of information units on the optical storage medium; and
   a sync pattern selector, for determining the type of each of the long run-length sync patterns, wherein the sync pattern selector determines at least one long run-length sync pattern as a space when spaces with run-lengths longer than a length threshold do not appear for a time period longer than a time threshold.

8. The optical recording apparatus of claim 7, wherein when spaces with run-lengths longer than the length threshold do appear within a time period shorter than the time threshold, the sync pattern selector determines the type of the at least one long run-length sync pattern so as to allow a digital sum value (DSV) to be minimized.

9. The optical recording apparatus of claim 7, wherein the optical recording apparatus determines the time threshold according to a writing speed used by the optical recording apparatus when recording the plurality of information units on the optical storage medium.

10. The optical recording apparatus of claim 7, wherein the recording means comprises a pickup head, the optical recording apparatus generates a receiving signal according to a light beam reflected from the optical storage medium and detected by the pickup head, and the optical recording apparatus further comprises:
    a sampler, for sampling the receiving signal when spaces with run-lengths longer than the length threshold are established on the optical storage medium in order to generate a sampled signal; and
    a controller, for generating a control signal according to a signal status of the sampled signal, and controlling the pickup head with the control signal.

11. The optical recording apparatus of claim 10, wherein the signal status of the sampled signal corresponds to a power level of the laser light outputted by the pickup head when spaces are established on the optical storage medium.

12. The optical recording apparatus of claim 11, wherein the controller controls the power level of the laser light outputted by the pickup head when spaces are established on the optical storage medium according to the control signal.

13. The optical recording apparatus of claim 10, wherein the signal status of the sampled signal corresponds to a servo error status.

14. A method used by an optical recording apparatus, the optical recording apparatus comprising a recording means for recording a plurality of information units on an optical storage medium, each of the information units comprising a long run-length sync pattern, the method comprising:
determining a time period that marks with run-lengths longer than a length threshold do not appear; and
if the time period that marks with run-lengths longer than the length threshold do not appear is longer than a time threshold, establishing at least one long run-length sync pattern as a mark.

15. The method of claim 14, further comprising:
if marks with run-lengths longer than the length threshold do appear within a time period shorter than the time threshold, establishing the at least one long run-length sync pattern as a mark or a space so as to minimize a digital sum value.

16. The method of claim 14, further comprising:
determining the time threshold according to a writing speed used by the optical recording apparatus when recording the plurality of information units on the optical storage medium.

17. The method of claim 14, wherein the recording means comprises a pickup head, and the method further comprises:
generating a receiving signal according to a light beam reflected from the optical storage medium and detected by the pickup head;
sampling the receiving signal when marks with run-lengths longer than the length threshold are established on the optical storage medium in order to generate a sampled signal; and
generating a control signal according to the sampled signal in order to control the pickup head.

18. The method of claim 17, wherein the signal status of the sampled signal corresponds to a power level of the laser light outputted by the pickup head when marks are established on the optical storage medium.

19. The method of claim 18 further comprising:
controlling the power level of the laser light outputted by the pickup head when marks are established on the optical storage medium according to the control signal.

20. A method used by an optical recording apparatus, the optical recording apparatus comprising a recording means for recording a plurality of information units on an optical storage medium, each of the information units comprising a long run-length sync pattern, the method comprising:
determining a time period that spaces with run-lengths longer than a length threshold do not appear; and
if the time period that spaces with run-lengths longer than the length threshold do not appear is longer than a time threshold, establishing at least one long run-length sync pattern as a space.

21. The method of claim 20, further comprising:
if spaces with run-lengths longer than the length threshold do appear within a time period shorter than the time threshold, establishing the at least one long run-length sync pattern as a mark or a space so as to minimize a digital sum value.

22. The method of claim 20, further comprising:
determining the time threshold according to a writing speed used by the optical recording apparatus when recording the plurality of information units on the optical storage medium.

23. The method of claim 20, wherein the recording means comprises a pickup head, and the method further comprises:
generating a receiving signal according to a light beam reflected from the optical storage medium and detected by the pickup head;
sampling the receiving signal when spaces with run-lengths longer than the length threshold are established on the optical storage medium in order to generate a sampled signal; and
generating a control signal according to the sampled signal in order to control the pickup head.

24. The method of claim 23, wherein the signal status of the sampled signal corresponds to a power level of the laser light outputted by the pickup head when spaces are established on the optical storage medium.

25. The method of claim 24 further comprising:
controlling the power level of the laser light outputted by the pickup head when spaces are established on the optical storage medium according to the control signal.

26. The method of claim 23, wherein the signal status of the sampled signal corresponds to a servo error status.

* * * * *